(12) United States Patent
Fukunaga

(10) Patent No.: US 6,443,491 B1
(45) Date of Patent: Sep. 3, 2002

(54) DEVICE FOR ROCKABLY SUPPORTING A STEERING COLUMN FOR A TILT-TYPE STEERING APPARATUS

(75) Inventor: Yuichiro Fukunaga, Gunma-ken (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/271,865

(22) Filed: Mar. 18, 1999

(30) Foreign Application Priority Data

Mar. 20, 1998 (JP) .......................................... 10-071713

(51) Int. Cl.[7] ................................................ B62D 1/18
(52) U.S. Cl. ........................ 280/779; 280/777; 280/780; 74/493
(58) Field of Search ................................ 280/775, 777, 280/779, 780; 74/492, 493, 491, 495

(56) References Cited

U.S. PATENT DOCUMENTS

| | | | | |
|---|---|---|---|---|
| 3,578,782 A | * | 5/1971 | Miyoshi | 180/232 |
| 3,817,118 A | * | 6/1974 | Kitzner et al. | 74/492 |
| 3,921,747 A | * | 11/1975 | Suzuki et al. | 180/78 |
| 4,445,708 A | * | 5/1984 | Oakes et al. | 280/777 |
| 4,616,522 A | * | 10/1986 | White et al. | 74/492 |
| 4,627,306 A | * | 12/1986 | Berenjian | 74/492 |
| 4,703,669 A | * | 11/1987 | Hyodo | 74/492 |
| 4,998,999 A | * | 3/1991 | Yuzuriha et al. | 280/777 |
| 5,052,715 A | * | 10/1991 | Ervin et al. | 280/775 |
| 5,081,879 A | * | 1/1992 | Pidgeon | 74/492 |
| 5,181,435 A | * | 1/1993 | Khalifa et al. | 74/492 |
| 5,230,533 A | * | 7/1993 | Yamaguchi | 280/775 |
| 5,259,646 A | * | 11/1993 | Snyder | 280/777 |
| 5,294,149 A | | 3/1994 | Haldric et al. | 280/775 |
| 5,690,363 A | * | 11/1997 | Rybinski | 280/779 |
| 5,819,592 A | * | 10/1998 | Lewandowski et al. | 74/492 |
| 5,845,936 A | * | 12/1998 | Higashino | 280/775 |
| 5,857,703 A | * | 1/1999 | Kinoshita et al. | 280/492 |
| 5,875,686 A | * | 3/1999 | Kinoshita et al. | 74/492 |
| 5,961,146 A | * | 10/1999 | Matsumoto et al. | 280/777 |

FOREIGN PATENT DOCUMENTS

| | | |
|---|---|---|
| JP | 64-36283 | 3/1989 |
| JP | 4-114872 | 10/1992 |
| JP | 4-331660 | 11/1992 |
| JP | 5-11750 | 3/1993 |
| JP | 5-65747 | 8/1993 |
| JP | 7-10996 | 3/1995 |
| JP | 7-19056 | 4/1995 |

* cited by examiner

*Primary Examiner*—Paul N. Dickson
*Assistant Examiner*—Deanna L. Draper
(74) *Attorney, Agent, or Firm*—Miles & Stockbridge P.C.

(57) ABSTRACT

In a device for rockably supporting a steering column for a tilt-type steering apparatus, a front end of the steering column is passed through a hole formed through a support bracket fixed to a car body. The steering column is rockable with respect to the support bracket to effect tilt adjustment, and is fixed in the tilt-adjusted position. When the steering column is moved forward upon a secondary collision (a collision of the driver with the steering wheel), the support bracket deforms plastically to absorb collision energy.

15 Claims, 7 Drawing Sheets

DEVICE FOR ROCKABLY SUPPORTING A STEERING COLUMN FOR A TILT-TYPE STEERING APPARATUS

This application claims the benefit of Japanese Application No. 10-71713 which is hereby incorporated by reference.

BACKGROUND OF THE INVENTION

1. Field of the Invention

The present invention relates to a device for rockably supporting a steering column for a tilt-type steering apparatus. The device for rockably supporting a steering column for a tilt-type steering apparatus is adapted to support the front part of the steering column to allow rock thereof to freely adjust the height of a steering wheel. The present invention further relates to a device for rockably supporting a steering column for a tilt-type steering apparatus that allows the steering column to be displaced forward while absorbing energy generated upon a secondary collision (collision of a driver with a steering wheel).

2. Related Background Art

To adjust the height of the steering wheel of a car to meet the physical constitution or a driving posture of the driver, a height adjustment apparatus of a steering wheel called a tilt-type steering apparatus is conventionally widely used. A support device for rockably supporting the front part of the steering column to allow rocking movement and adjust tilt of the steering column is incorporated in such tilt-type steering apparatus.

FIGS. 9 to 11 show an example of the tilt-type steering apparatus incorporating such support device of the steering column disclosed in Japanese Utility Model Application Laid-Open No. 4-114872. In these figures, a fixed or stationary bracket 1 is supported and fixed to the car body at the lower face of the dashboard. This fixed bracket 1 has a pair of vertical walls 2 that are in parallel to each other, and a pair of elongated holes 3 that are respectively formed in a vertical direction (up-and-down direction in FIG. 9) at positions of the paired vertical walls 2 to be aligned with each other.

An up and down movable bracket 5 is fixed to an intermediate portion of a steering column 4 through which a steering shaft 10 is inserted, and this movable bracket 5 is sandwiched between the paired vertical walls 2. Both ends of a movable rod 6 that passes through the movable bracket 5 in the lateral direction (direction perpendicular to the sheet in FIG. 9) are projected from the outer sides of the paired vertical walls 2 through the paired elongated holes 3. A tilt lever 7 is supported at one of these ends. This tilt lever 7 is operable to engage the fixed bracket 1 with the movable bracket 5 or release such engagement.

When the tilt lever 7 is in the state shown in FIG. 9, the inner sides of the vertical walls 2 of the fixed bracket 1 are urged upon the outer side of the movable bracket 5 by a nut (not shown) that is fixed to the center of rotation of this tilt lever 7 and threadably engaged with the end of the movable rod 6. Thus, the movable bracket 5 is fixed to the fixed bracket 1. At the same time, an edge of a stopper 8 formed at the base end of the tilt lever 7 and a stretching wall 9 formed on the fixed bracket 1 are brought into abutment.

When the tilt lever 7 is rotationally moved from the state shown in FIG. 9 in the clockwise direction in the same figure, the edge of the stopper 8 and the stretching wall 9 are separated from each other and the urged state mentioned above is released. Then, the movable bracket 5 is freely movable upward or downward.

A support bracket 11 is provided on the outer periphery of the front-end portion of the steering column 4 (the left end part in FIG. 9). This support bracket 11 is integrally formed of a metallic plate having elasticity such as a steel platemade by press-forming. An upper edge portion of this support bracket 11 constitutes a mounting portion 12 that is bent at a right angle backward (to the right in FIGS. 9 and 10) to be attached to the car body. Circular holes 13, 13 each for-receiving a mounting bolt are formed at both ends of this mounting portion 12. A circular hole 15 for receiving the steering column 4 is formed at the center of a support portion that is extended downward from the front edge of the mounting portion 12 at a right angle. Plural support flaps 19 (four in the illustrated example) are formed at intervals on the periphery of the circular hole 15 with cut-away portions 17 each formed between the edges of adjacent support flaps 19 in the circumferential direction. Arched walls 16 are formed on the inner edges of these support flaps 19 to be bent at a right angle backward from the inner edges of the support flaps 19. These arched walls 16 jointly constitute a cylindrical support portion 18. The arched walls 16 are formed such that the inner diameter of the cylindrical support portion 18 in a free state is slightly smaller than the outer diameter of the front part of the steering column 4.

Into the cylindrical support portion 18 of the support bracket 11 constituted as described above, the front-end portion of the steering column 4 is inserted, elastically deforming outward in the radial direction the arched walls 16 constituting this cylindrical support portion 18. Then, after the insertion, the front-end portion of the steering column 4 is elastically supported on the inner side of this cylindrical support portion 18. In this state, the front-end portion of the steering column 4 is elastically urged over the entire circumference thereof (except the cut-away portions 17 mentioned above) by the cylindrical support portion 18 constituted by the arched walls 16. Further, the support bracket 11 is fixed to the car body by bolts that pass through the respective circular holes 13, 13 of the mounting portion 12 from below.

In the case of a tilt-type steering apparatus constituted as described above, when the steering column 4 is rocked upon the height adjustment of the steering wheel, the arched walls 16 constituting the cylindrical support portion 18 are elastically deformed. At the same time, when an inner peripheral surface of a part of the arched wall 16 slides on the outer peripheral surface of the steering column 4, smooth rocking of the steering column 4 is allowed. In the state in which the front-end portion of the steering column 4 is thrust into the cylindrical support portion 18, this cylindrical support portion 18 elastically suppresses the front-end portion of the steering column 4 substantially over the entire periphery thereof.

The conventional tilt-type steering apparatus constituted as described above has significant drawbacks. For example, in the conventional structure, it is impossible for the support bracket 11 to stabilize a collapse load required for displacing the steering column 4 forward in a secondary collision, as described above. More specifically, in the case of the conventional structure, the arched walls 16 are formed as being bent at right angles backward from the inner peripheries of the support flaps 19. As a result, when the front-end portion of the steering column 4 is displaced forward in the secondary collision, the leading edge of all or a part of the arched walls 16 (the right edge in FIGS. 9 and 10) possibly bites into the outer peripheral surface of the steering column 4. In this case, it is difficult for the steering column 4 to be displaced forward and the collapse load possibly becomes unstable. For this reason, in the conventional structure, the steering column 4 is formed by telescopically combining an outer column and an inner column to be contracted in the secondary collision. However, such contractible steering column costs more, compared with a single-column structure steering column.

When the front-end portion of the steering column 4 is inserted into the cylindrical support portion 18 from the rear side (the right side in FIGS. 9 and 10) of the support bracket 11 so that the front part of the steering column 4 is inserted into the cylindrical support portion 18, the front edge of the steering column 4 and the leading edges of the arched walls 16 tend to mutually interfere. Consequently, it becomes troublesome to mount the support bracket 11 on the front part of the steering column 4. On the other hand, when the steering column 4 is inserted into the cylindrical support portion 18 from the front side (the left side in FIGS. 9 and 10) of the support bracket 11, it is necessary to move the support bracket 11 inserted from the rear end side of the steering column 4 to the front part of the steering column 4 while elastically deforming the arched walls 16, 16 outward in the radial direction thereof. In addition, in this case, it becomes troublesome to mount the support bracket 11 on the front part of the steering column 4.

The support bracket 11 is mounted on the front-end portion of the steering column 4 by the elasticity of the cylindrical support portion 18. For this reason, when the support bracket 11 mounted on the front part of the steering column 4 is to be conveyed or assembled in the car body, if this support bracket 11 strikes another part of the car or the like, the support bracket 11 possibly deviates from the normal mount position in the front part of the steering column 4. When the mount position of the support bracket 11 is out of place, bolts inserted through the circular holes 13, 13 (see FIG. 11) of the mounting portion 12 cannot be threadably engaged with screw holes formed in a part of the car body. Consequently, it is necessary to mount the mounting portion 12 with care so that the mount position of the support bracket 11 is not out of place. Thus, the assembling workability thereof decreases correspondingly.

There is also a demand for giving an energy absorbing function to the support bracket for supporting the front part of the steering column to allow rocking movement by its own elasticity as described above.

SUMMARY OF THE INVENTION

A first object of the present invention is to provide a device for rockably supporting a steering column for a tilt-type steering apparatus that is free from the above-mentioned drawbacks of the conventional technology.

A device for rockably supporting a steering column for a tilt-type steering apparatus according to the present invention comprises a support bracket formed integrally of a plate member having elasticity for rockably supporting the front part of a steering column of the tilt-type steering apparatus to the car body, a mounting portion for mounting the support bracket on the car body, and a support portion for supporting the steering column on the support bracket.

The support portion comprises a circular hole for passing the steering column and a plurality of support flaps formed between each adjacent two of a plurality of cut-away portions formed at intervals outward in the radial direction on the inner periphery of the circular hole.

Specifically, the device for rockably supporting a steering column for a tilt-type steering apparatus according to the present invention for achieving the above object is provided with a plurality of arched walls for constituting a cylindrical support portion which elastically presses the outer periphery of the front part of the steering column substantially over the entire periphery thereof on the inner periphery of each of the plural support flaps. Each of these arched walls is provided as bending forward from the inner periphery of each of the support flaps. Then, the front part of the steering column is supported to be rockable on the inner side of the cylindrical support portion by thrusting the front part of the steering column into the cylindrical support portion while elastically deforming each of the arched walls outward in the radial direction of the cylindrical support portion.

A second object of the present invention is to provide a device for rockably supporting a steering column for a tilt-type steering apparatus to satisfy the above-mentioned demand. In a device for rockably supporting the steering column for achieving the second object, substantially the entire outer peripheral surface of the front part of the steering column is elastically pressed by the inner periphery of each of the support flaps, and in the central portion of the inner periphery of one of the support flaps provided either at the upper end or the lower end of the circular hole there is provided a protruding portion protruding more inward in the radial direction, than other parts of the inner periphery. Then, the front part of the steering column is thrust into each of these support flaps while the support flaps are elastically deformed outward in the radial direction of the circular hole. At the same time, the protruding portion and a slit, which is formed at a position aligned with the protruding portion in the front part of the steering column for freely passing the protruding portion, are engaged with each other, thereby supporting the front part of the steering column inside the support flaps to be rockable about the engagement portion between the protruding portion and the slit as the center of rock. Further, when the steering column is displaced forward in the axial direction at collision, an abutment means which is a part of the outer periphery of the steering column and provided in the rear of the support bracket and a part of the support bracket are brought into abutment, thereby absorbing the energy generated upon the collision while elastically deforming the support bracket.

In the case of a device for rockably supporting a steering column for a tilt-type steering apparatus of the present invention constituted as described above, when the steering column is rocked upon the height position adjustment of the steering wheel, the support flaps and the arched walls for constituting the support portion are elastically deformed, thereby allowing the steering column to be rocked.

In the device for rockably supporting a steering column for a tilt-type steering apparatus for achieving the first object mentioned above, the arched walls that constitute a cylindrical support portion for elastically supporting the outer peripheral surface of the front part of the steering column are provided as being bent at right angles forward from the inner periphery of each of the support flaps. For this reason, when the steering column is forward displaced in a secondary collision, the leading edge of each of the arched walls does not bite into the outer peripheral surface of the steering column. Consequently, even if this steering column is not contractible, a collapse load in a secondary collision can be stabilized without fail. In addition, when the front-end portion of the steering column is inserted into the cylindrical support portion from the rear side of the support bracket, the arched walls do not interfere with the insertion. Consequently, a work for inserting the leading end of the steering column into the cylindrical support portion can be performed easily.

In the device for rockably supporting a steering column for a tilt-type steering apparatus for achieving the second object mentioned above, the inner periphery of each of the support flaps is formed in an edge-like shape. Consequently, in the state that the outer peripheral surface of the front part of the steering column is elastically urged upon the inner periphery of each of the support flaps, it is possible to have a large contact pressure between the outer peripheral surface and the inner periphery. It is also possible to have a larger rigidity for supporting the front part of the steering column by the support bracket. Note that the inner periphery of each of the support flaps is brought into contact as being substantially perpendicular to the outer peripheral surface of the steering column or in a slightly forward inclined manner. For this reason, even when the steering column is forward displaced in a secondary collision, the inner periphery of each of the support flaps is immediately displaced in a direction in which it is retracted from the outer peripheral surface of the steering column. Accordingly, the inner periphery of each of the support flaps does not bite into the outer peripheral surface of the steering column to inhibit the forward displacement of the steering column. When the support bracket is assembled in the front part of the steering column, a protruding portion that is formed on the inner periphery of the support flap provided either at the upper end or at the lower end of the circular hole and a slit that is a part of the outer peripheral surface of the front part of the steering column and is formed in a part aligned with the protruding portion are brought into engagement. Accordingly, when the mounting portion of the support bracket mounted on the front part of the steering column is to be assembled in the car body, even if this support bracket strikes another car part or the like, the support bracket does not deviate from the normal mount position in the front part of the steering column on the basis of the existence of the engagement portion between the protruding portion and the slit. Since the steering column is rocked around the engagement portion between the protruding portion and the slit, a range of movement of the front part of this steering column can be controlled securely. Accordingly, it is possible to prevent the front part of the steering column from interfering with a peripheral member at the time of height adjustment of the steering wheel.

When the steering column is displaced forward in a secondary collision, an abutment means that is a part of the outer peripheral surface of the steering column and is provided in the rear of the support bracket and a part of this support bracket are brought into abutment, thereby sufficiently absorbing the energy generated upon the secondary collision while plastically deforming the support bracket. For this reason, it is possible to provide the support member with the energy absorbing function.

DESCRIPTION OF THE PREFERRED EMBODIMENTS

Figure 1:
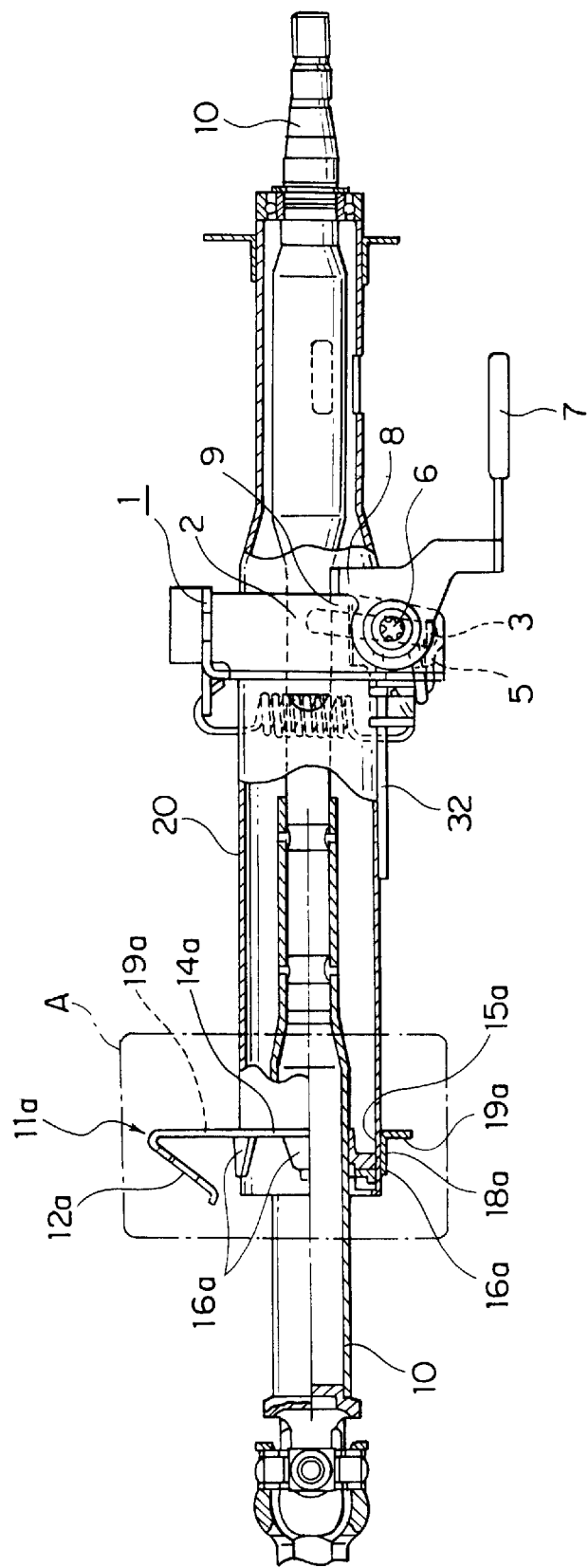
FIG. 1 is a longitudinal side view showing a part of a tilt-type steering apparatus that incorporates a device rockably supporting a steering column according to a first embodiment of the present invention.
Figure 2:
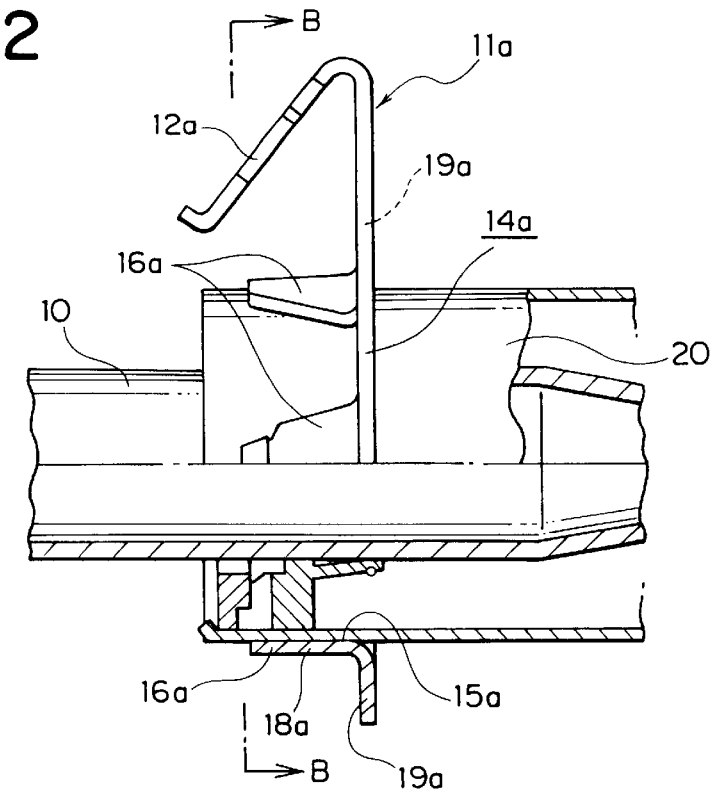
FIG. 2 is a cross sectional view showing the portion A in FIG. 1 in an enlarged manner.
Figure 3:
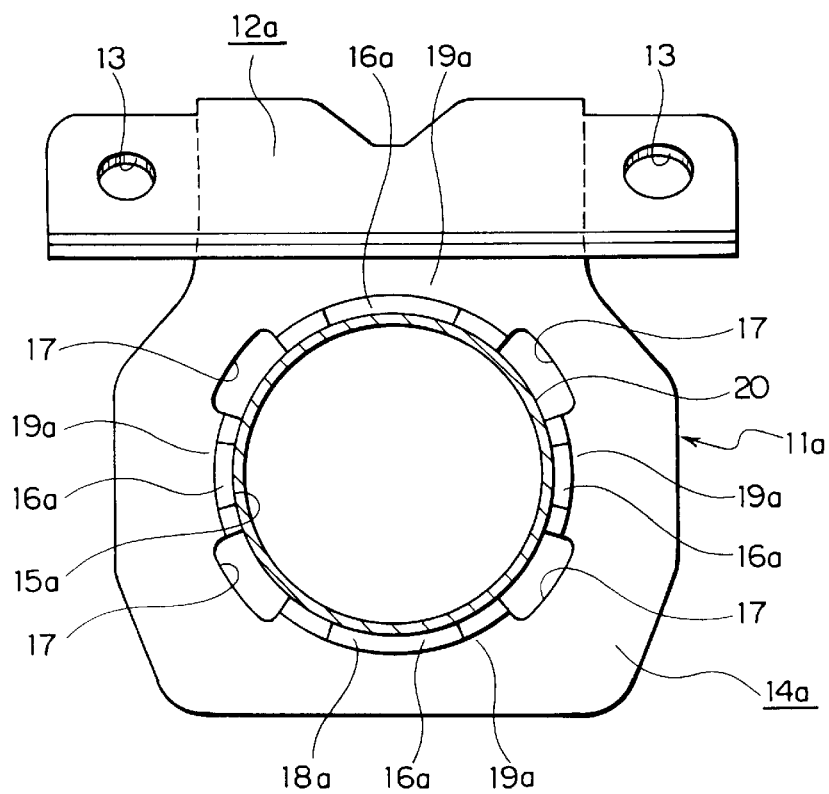
FIG. 3 is a view taken along the line B—B in FIG. 2 with omission of some of the constituent parts.
Figure 4:
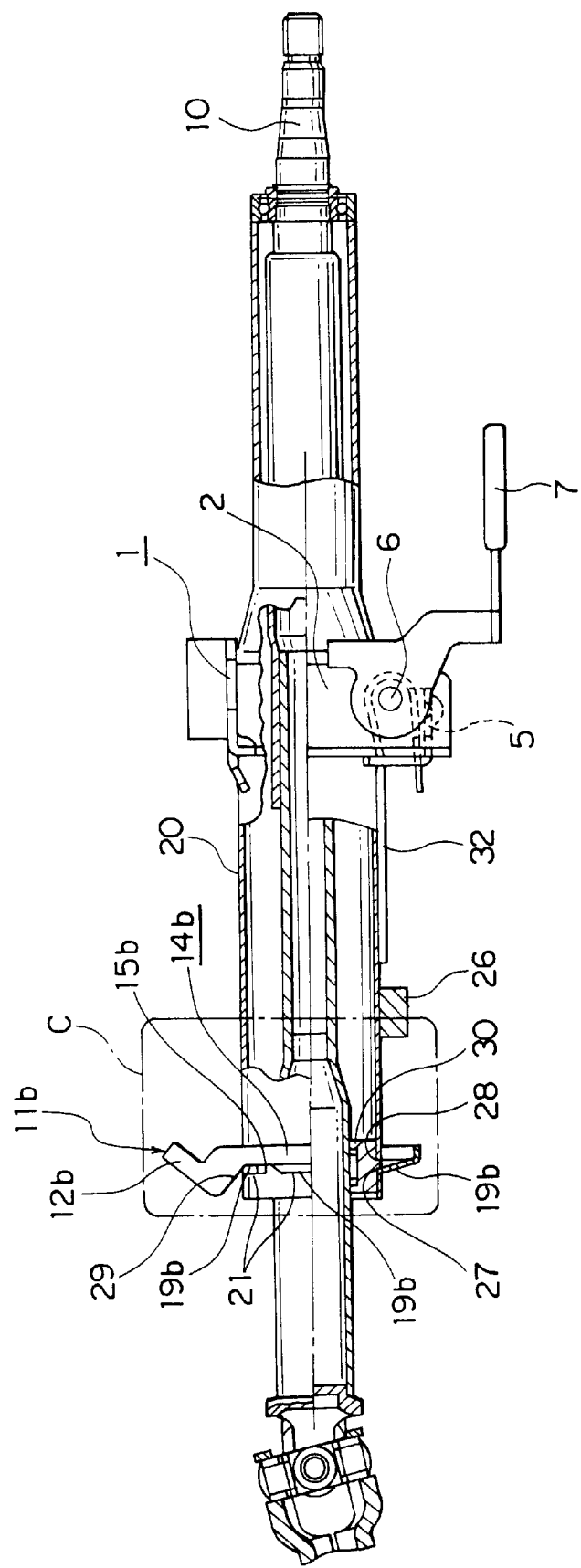
FIG. 4 is a longitudinal side view showing a part of a tilt-type steering apparatus that incorporates a device rockably supporting a steering column according to a second embodiment of the present invention.
Figure 5:
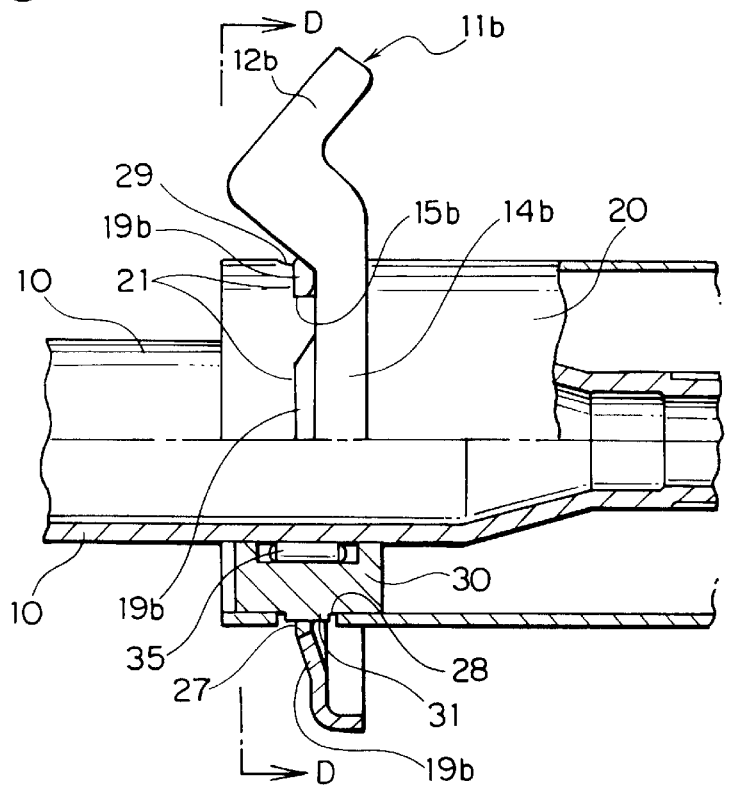
FIG. 5 is a cross sectional view showing the portion C in FIG. 4 in an enlarged manner.
Figure 6:
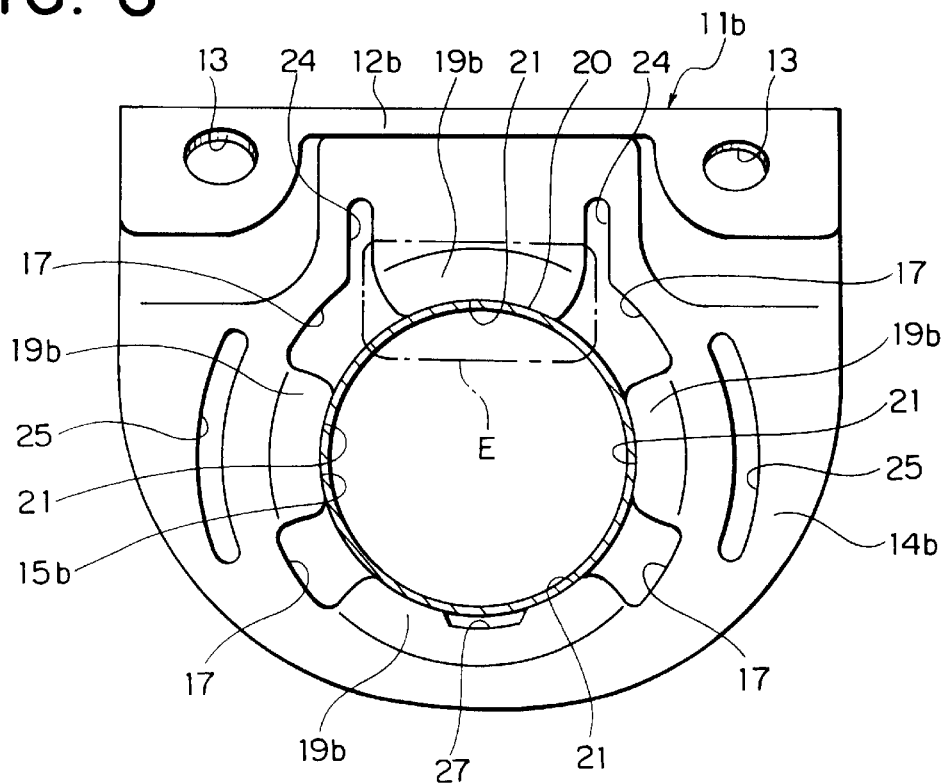
FIG. 6 is a view taken along the line D—D in FIG. 5 with omission of some of the constituent parts.
Figure 7:
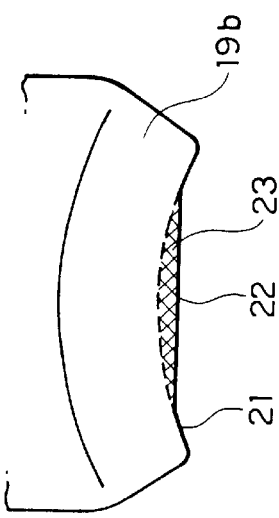
FIG. 7 is a view showing the portion E in FIG. 6 with omission of a steering column, in an enlarged manner.
Figure 9:
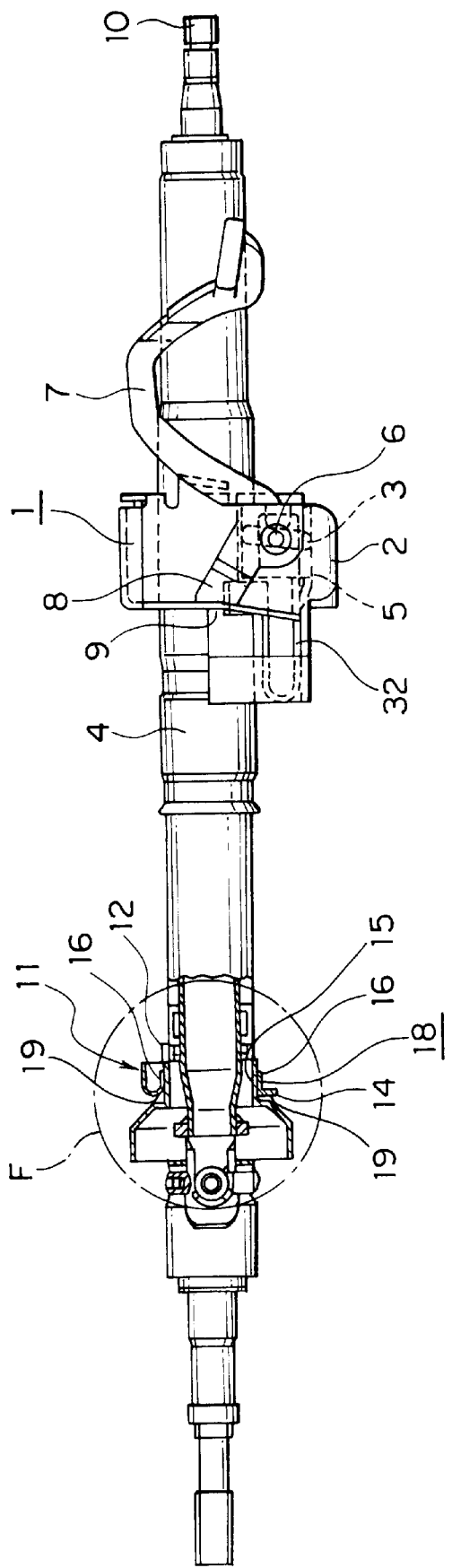
FIG. 9 is a longitudinal side view showing a part of a tilt-type steering apparatus that incorporates a conventional device rockably supporting a steering column.
Figure 10:
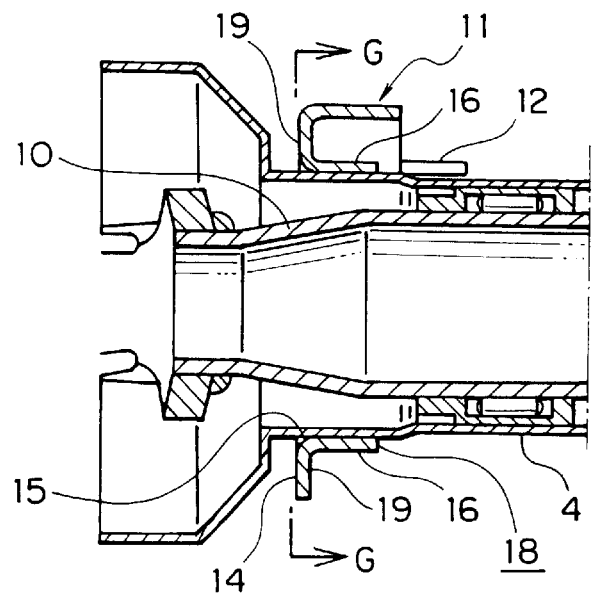
FIG. 10 is a view showing the portion F in FIG. 9 in an enlarged manner.
Figure 11:
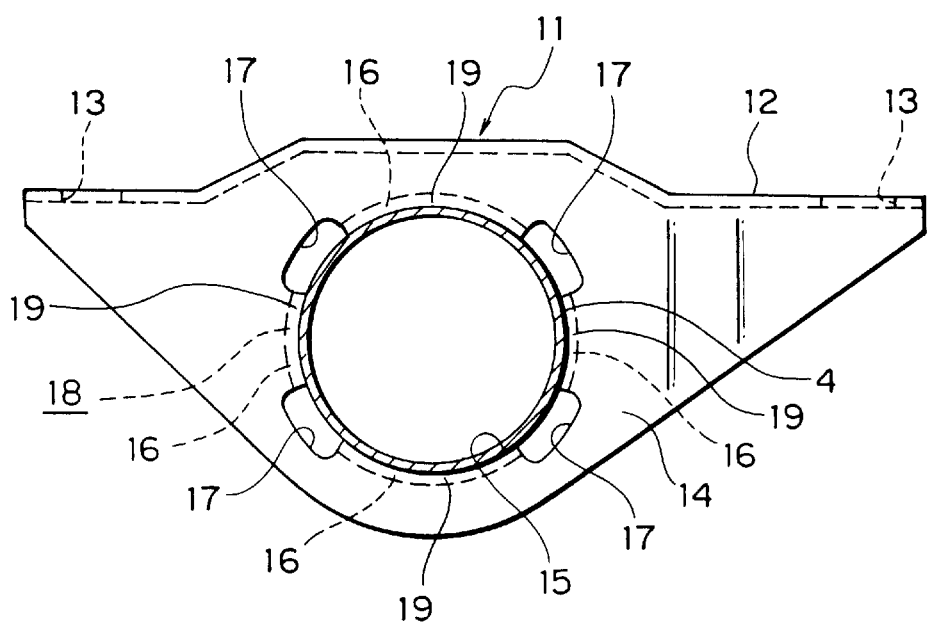
FIG. 11 is a view taken along the line G—G in FIG. 10 with omission of some of the constituent parts.

FIGS. 1 to 3 show a first embodiment of the present invention. Note that the present invention is characterized by the structure of a support portion of a support bracket for rockably supporting the front-end portion of a steering column as well as by the structure of an outer peripheral surface portion of the front-end portion of the steering column. Other structures and operations are substantially the same as those of the conventional apparatus shown in FIGS. 9 to 11. The same reference numbers are given to the corresponding portions and description of redundant arrangements is omitted or simplified. Description will be made with emphasis on the arrangements characteristic of the present invention and portions different from the above-mentioned structure.

A fixed or stationary bracket 1 is adapted to be supported by and fixed to the car body on the lower face of the dashboard, or the like. This fixed bracket 1 has a pair of vertical walls 2 that are in parallel to each other. A pair of elongated holes 3 are formed at positions aligned with each other along the vertical direction (the up-and-down direction in FIG. 1) on the respective vertical walls 2.

A movable bracket 5 which is movable up and down is fixed to an intermediate portion of a steering column 20 passing a steering shaft 10 therethrough, and this movable bracket 5 is sandwiched between the paired vertical walls 2. Both ends of a movable rod 6 which is inserted through the movable bracket 5 in the lateral direction (perpendicular direction to the sheet in FIG. 1) are projected from the outer sides of the paired vertical walls 2 through the paired elongated holes or slots 3. A tilt lever 7 is supported at one of these ends. This tilt lever 7 is adapted to engage the fixed bracket 1 with the movable bracket 5, or to release such engagement.

When the tilt lever 7 is in the state shown in FIG. 1, the inner sides of the vertical walls 2 of the fixed bracket 1 are urged upon the outer side of the movable bracket 5 by a nut (not shown) fixed to the center of rotation of this tilt lever 7 and threadably engaged with the end of the movable rod 6. Thus, the movable bracket 5 is fixed to the fixed bracket 1. At the same time, an edge of a stopper 8 formed at the base of the tilt lever 7 and a stretching wall 9 formed on the fixed bracket 1 are brought into abutment. When the tilt lever 7 is rotated from the state shown in FIG. 1 in the clockwise direction in the same figure, the edge of the stopper 8 and the stretching wall 9 are separated from each other and the urged state is released. Then, the movable bracket 5 becomes free to be moved upward or downward.

In the first embodiment, a steering column 20 for a tilt-type steering apparatus is formed by a single cylindrical member. A support bracket 11a is provided on the outer periphery of the front-end portion of the steering column 20 (the left end part in FIG. 1). This support bracket 11a is integrally formed of a metallic plate having elasticity such as a steel plate made by press-forming. An upper edge portion of this support bracket 11a constitutes a mounting portion 12a that is bent at an acute angle forward (to the left in FIGS. 1 to 2) to be attached to the car body. Circular holes 13 each for receiving a mounting bolt are formed at both ends of this mounting portion 12a. A circular hole 15a for receiving the steering column 20 which is formed by one cylindrical member and which is not contractable on its own, is formed at the center of a support portion 14a that is extended downward from the front edge of the mounting portion 12a. Then, plural support flaps 19a (four in the illustrated embodiment) are formed at intervals on the periphery of the circular hole 15a with cut-away portions 17 each formed between the edges of adjacent support flaps 19a in the circumferential direction. Arched walls 16a are formed on the inner edges of these support flaps 19a to be bent at a right angle forward from the inner edges of the support flaps 19a. These arched walls 16a jointly constitute a cylindrical support portion 18a. The arched walls 16a are formed such that the inner diameter of the cylindrical support portion 18a in a free state is a little smaller than the outer diameter of the front part of the steering column 20.

In the case of the support bracket 11a constituted as described above, the arched walls 16a constituting the cylindrical support portion 18a which elastically supports the outer periphery of the front-end of the steering column 20, are bent forward at a right angle from the inner peripheral ends of the respective support flaps 19a. For this structure, in the case where the steering column 20 is displaced forward at a secondary collision, the front edge of each arched wall 16a never bites into the outer peripheral surface of the steering column 20. Consequently, the steering column 20 is not prevented from displacing forward, so that collapse load at the time of a secondary collision can be stabalized. Further, even when the front-end portion of the steering column 20 is inserted into the cylindrical support portion 18a from the rear side of the support bracket 11a, the arched walls 16a do not become obstacles. For this reason, the front-end portion of the steering column 20 can be inserted easily into the cylindrical support portion. At a secondary collision, the movable bracket 5 falls forward from the fixed bracket 1, and the steering column is displaced forward. In this case, an energy absorbing means 32 is plastically deformed to absorb the impact energy, thereby easing the impact to be applied on the body of the driver in collision with a steering wheel (not shown).

Next, FIGS. 4 to 8 illustrate a second embodiment of the present invention. In the second embodiment, a support bracket 11b comprises a mounting portion 12b to be fixed to the car body and a support portion 14b, which are integrally formed by press-forming of a steel plate or a metallic plate having elasticity. The mounting portion 12b is formed by bending the upper end of the support bracket 11b, backward (to the right in FIG. 4) at an obtuse angle. The support portion 14b is extended downward from the lower end of the mounting portion 12b. At both right and left ends of the mounting portion 12b, circular holes 13 are formed each for receiving a mounting bolt therethrough.

At the center of the support portion 14b, a circular hole 15b is formed for receiving the steering column 20 therethrough. On the periphery of this circular hole 15b, plural support flaps 19b (four in this embodiment) are provided at intervals. Cut-away portions 17 are respectively formed between adjacent support flaps 19b on the periphery in the circumferential direction.

In the second embodiment, arched walls (FIGS. 9 to 11, and FIGS. 1 to 3) are not provided at the inner periphery of each of the support flaps 19b constituting the support portion 14b of the support bracket 11b, unlike the above-described conventional structure and the above-described first embodiment. Rather, in the second embodiment, the inner periphery of each of the support flaps 19b is formed as an arched edge 21. Each of the support flaps is formed by bending slightly the base end (outer end) of each of the support flaps 19b in such a manner that an amount of protrusion from the front face of the support portion 14b (the left face in FIGS. 4, 5 and 8) increases more at a portion nearer to the leading edge (the inner periphery) thereof. The diameter of a circle inscribed in each of the arched edges 21 a free state, that is, the diameter of the circular hole 15b formed in the support portion 14b, is made a little smaller than the outer diameter of the front part of the steering column 20.

In the central portion of the inner periphery of the support flap 19b provided at the upper end of the circular hole 15b, a straight line portion 22 more inward in the radial direction than other portions on the same inner periphery is formed. A portion protruding more inward than other portions on said inner periphery in the radial direction, including this straight line portion 22 (the portion indicated by the slanting lattice in FIG. 7) is called a protruding portion 23. A recess 27 is formed outward in the radial direction at the center of the inner periphery of the support flap 19b provided at the lower end of the circular hole 15b.

Notches 24, 24 are formed upward at end portions of the cut-away portions 17 circumferentially adjacent to the support flap 19b provided at the upper end of the circular hole 15b. By forming such notches 24, 24, it becomes possible to secure an amount of elastic deformation of the support flap 19b provided at the upper end of the circular hole 15b. Arched through holes 25 are formed in support portion 14b outside the support flaps 19b at both the right and left sides of the circular hole 15b. The centers of curvature of the arched through holes 25 are substantially at the center of the circular hole 15. These through holes 25 are also provided to secure an amount of elastic deformation of the support flaps 19b formed at both sides of the circular hole 15b.

In a portion on which the support bracket 11b is to be assembled and which is aligned with the protruding portion 23 on the outer peripheral surface of the front-end portion of the steering column 20 (that is, an upper surface portion of the front part of the steering column 20), a slit 29 through which this protruding portion can be freely inserted is formed. In the same manner, an engagement hole 28 is formed in a portion that is aligned with the recess 27 (that is, on the lower surface of the front portion of the steering column 20). The recess 27 is provided to prevent mutual interference between the support flap 19b and a projection 31 of a holder 30 which projection intrudes into the engagement hole 28. The holder 30 holds a radial needle bearing 35 for supporting the steering shaft 10. The recess 27 is provided also to facilitate smooth rocking displacement of the steering column 20. An abutment member 26, to be described later, serving as the abutment means is fixed to a lower surface of the front-end portion of the steering column 20 behind the support bracket 11b.

When the front-end portion of the steering column 20 is mounted to the support bracket 11b as mentioned above, the front-end portion of the steering column 20 is thrust forward into the circular hole 15b while the support flaps 19b are elastically deformed outward in the radial direction of the circular hole 15b. At the same time, the protruding portion 23 that is formed on the inner periphery of the support flap 19b formed at the upper end of the circular hole 15b is engaged with the slit 29 that is formed on the upper surface of the front-end portion of the steering column 20. In this state, the front-end portion of the steering column 20 is elastically pressed by the arched edges 21 provided at the leading ends of the support flaps 19b substantially over the entire circumference thereof (except the cut-away portions 17). Further, the support bracket 11b is fixed to the car body by bolts inserted through the circular holes 13 of the mounting portion 12b from the lower rear side. For adjusting the height of the steering wheel, the steering column 20 is rocked around an engagement portion between the protruding portion 23 and the slit 29. When the steering column 20 is rocked in this manner, the support flaps 19b are elastically deformed and, at the same time, the arched edges 21 of the support flaps 19b other than that provided at the upper end of the circular hole 15b slide on the outer peripheral surface of the steering column 20, thereby allowing a smooth rocking movement of the steering column 20.

In the second embodiment arranged as described above, the leading edges of the support flaps 19b, are protruded forward slightly. For this reason, the front-end portion of the steering column 20 can be easily inserted into the circular hole 15b from the rear side of the support brackets 19b, since the leading edges of the support flaps do not stand in the way. In the state that the support bracket 11b is assembled to the front-end portion of the steering column 20, the protruding portion 23 formed on the inner periphery of the support flap 19b at the upper end of the circular hole 15b is engaged with the slit 29 provided on the upper surface of the front-end portion of the steering column 20. Accordingly, when the support bracket 11b mounted to the front part of the steering column 20 is assembled to the car body, if this support bracket 11b strikes another car part or the like, this support bracket 11b can be prevented from deviating from the normal mount position in the front part of the steering column 20, because of the presence of the engagement portion between the protruding portion 23 and the slit 29.

The arched edges 21 of the edge-formed support flaps 19b are brought into an elastic contact with the outer peripheral surface of the front-end portion of the steering column 20. For this reason, the contact pressure between the arched edges 21 of the support flaps 19b and the outer peripheral surface of the front-end portion of the steering column 20 can be made larger. Thus, the rigidity for supporting the front-end portion of the steering column 20 by the support bracket 11b can be larger. Consequently, it is possible to more effectively prevent a backlash in a fitting portion between the support bracket 11b and the steering column 20 due to vibration or the like in running of the car. Since the steering column 20 is rocked about the engagement portion between the protruding portion 23 and the slit 29, movement range of the front-end portion of the steering column 20 can be controlled. Accordingly, it is possible, in adjusting the height of the steering wheel, to prevent the front-end portion of the steering column 20 from interfering with peripheral components.

When the center of rocking movement of the steering column 20 is positioned in the upper surface portion of the front-end portion of the steering column 20, as in the second embodiment, movement of the lower surface side of the front-end portion of this steering column becomes large. For this reason, in the second embodiment, the engagement hole 28 is formed on the lower surface of the front part of the steering column 20 and the recess 27 is on the inner periphery of the support flap 19b at the lower end of the circular hole 15b, respectively, thereby preventing mutual interference between the lower surface of the front part of the steering column 20 and the central portion of the inner periphery of the above-mentioned support flap 19b even when the steering column 20 is rocked. Consequently, a resistance between the lower surface of the front part of the steering column 20 and the inner periphery of the support flap 19b when the steering column 20 is rocked can be smaller.

Figure 8:
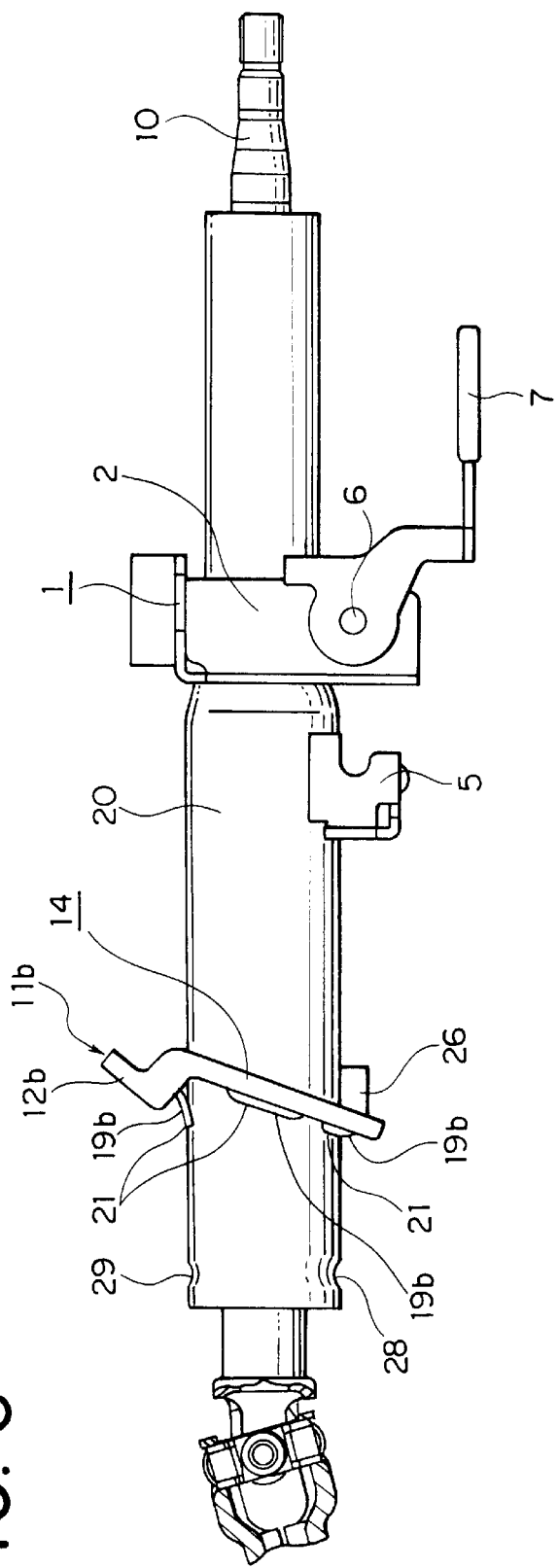
FIG. 8 is a longitudinal side view of a part of a tilt-type steering apparatus that incorporates a device rockably supporting a steering column, showing the state at the time of a secondary collision.

When the steering column 20 is displaced forward at the secondary collision, as shown in FIG. 8, the abutment member 26 that is fixed to the lower surface of the front-end portion of the steering column 20 in the rear of the support bracket 11b collides with the lower end of the support portion 14b of the support bracket 11b. Thereby it is possible to satisfactorily absorb the energy caused upon the secondary collision while plastically deforming the support bracket 11b forward. For this reason, the support bracket 11b can have the function of an energy-absorbing member. It should be noted that, in the second embodiment, the arched edges 21 at the inner peripheries of the support flaps 19b are brought into contact with the outer peripheral surface of the front-end portion of the steering column 20 in a slightly forward inclined manner, though substantially vertically thereto. For this reason, even when the steering column 20 is forward displaced as stated above, the arched edges 21 do not bite into the outer peripheral surface of the steering column 20 to prevent the forward displacement of the steering column 20. The device for rockably supporting the steering column provided with the energy absorbing function in the second embodiment is suitable for supporting a steering column which is composed of one cylindrical member, like the above-mentioned steering column 20, and having no energy absorbing mechanism of its own.

In the case of the foregoing second embodiment, the engagement portion between the protruding portion 23 and the slit 29 that serves as the center of rocking movement of the steering column 20 may be provided on the lower surface side of the front-end portion of the steering column 20, though illustration thereof is omitted. However, when the center of rocking movement is provided on the lower surface side, movement of the upper front-end portion of the steering column 20 becomes large. Thus, it becomes necessary to secure a gap between this upper surface of the front-end portion of the steering column 20 and another member such as the car body that is provided above the front-end portion of this steering column 20. For this reason, it is more preferable to provide the center of rocking movement of the steering column 20 on the upper surface side of the front-end portion of this steering column 20, as in the foregoing second embodiment.

In the case of the foregoing second embodiment, in order to give the function of the energy absorbing member to the support bracket 11b, a portion protruding downward may be directly formed on the lower surface of the front part of this steering column 20 to the rear of the support bracket 11b, instead of the abutment portion 26 fixed to the lower surface of the front part of this steering column 20. In the same manner, in order to give the function of the energy absorbing member to the support bracket 11b, the outer periphery of the steering column 20 may be tapered to have a larger diameter at a rear part thereof. Furthermore, the outer periphery of the steering column 20 may be formed to have steps with a larger diameter at a rear part thereof. In these cases, when the steering column 20 is displaced forward at the secondary collision, the outer periphery of the steering column 20 plastically deforms the support bracket 11b gradually with this forward displacement. For this reason, the collapse load at the secondary collision can be adjusted.

Since the device for rockably supporting a steering column for a tilt-type steering-apparatus of the present invention is constituted and operated as described above, the assembling work thereof can be facilitated. Further, in the case of the second embodiment, the energy caused upon the secondary collision can be absorbed. Consequently, the driver can be protected satisfactorily at a collision.

What is claimed is:

1. A device for supporting a steering column of a tilt-type steering apparatus for rocking movement, comprising:
   a support bracket formed integrally of a plate member having elasticity and constructed to support a front part of a steering column for rocking movement with respect to a vehicle body, the support bracket being provided with a mounting portion to fix said support bracket to the vehicle body and a support portion to support said steering column,
   wherein said support portion is provided with a circular hole to receive said steering column therethrough, a plurality of support flaps formed between each adjacent two of a plurality of cut-away portions formed, at circumferential intervals, outward in radial directions on an inner periphery of said circular hole, and a plurality of arched walls forming a cylindrical support potion which elastically presses an outer periphery of the front part of said steering column substantially over an entire circumference thereof, said arched walls being respectively formed on inner peripheries of said plurality of support flaps, and wherein, upon assembly, the front part of said steering column is thrust into said cylindrical support portion while said arched walls are elastically deformed radially outward of said cylindrical support portion, thereby supporting the front part of said steering column for rocking movement inside said cylindrical support portion, being characterized in that: each of said arched walls is bent towards a front end of said steering column from the inner periphery of a corresponding one of said support flaps.

2. A device according to claim 1, wherein said arched walls are bent such that said steering column may move forward in response to a secondary collision with substantially no biting of edges of said arched walls into the outer periphery of said steering column.

3. A device according to claim 2, further comprising:
   a rear support bracket to support a rear part of said steering column to the vehicle body, said rear support bracket allowing the steering column to move up and down to effect a tilt adjustment and allowing forward movement of the steering column in response to a secondary collision; and
   an energy absorbing member provided between said steering column and said rear support bracket, said energy absorbing member being plastically deformed by said forward movement of the steering column in response to the secondary collision.

4. A device according to claim 1, wherein said steering column is formed by a single cylindrical member.

5. A device for supporting a steering column of a tilt-type steering apparatus for rocking movement, comprising:
   a support bracket formed integrally of a plate member having elasticity and constructed to support a front part of a steering column for rocking movement with respect to a vehicle body, the support bracket being provided with a mounting portion to fix said support bracket to the vehicle body and a support portion constructed to support said steering column, being characterized in that:
   said support portion is provided with a circular hole to receive said steering column therethrough, a plurality of support flaps formed between each adjacent two of a plurality of cut-away portions formed, at circumferential intervals, outward in radial directions on an inner periphery of said circular hole, said support flaps having inner peripheries that elastically press an outer periphery of the front part of said steering column substantially over an entire circumference thereof, and a protruding portion formed at a center of the inner periphery of one of the support flaps provided either at an upper side or a lower side of said circular hole to be protruding more inward than other parts of this inner periphery in a radial direction and wherein, upon assembly, the front part of said steering column is thrust into said circular hole while the support flaps are elastically deformed radially outward of said circular hole, and said protruding portion is engaged with a slit formed in a part aligned with said protruding portion in the front part of said steering column to thereby support the front part of said steering column in said circular hole for rocking movement about an engagement portion between said protruding portion and said slit as a center of rocking movement, and when said steering column is forward displaced in an axial direction at a secondary collision, an abutment portion on the outer periphery of said steering column and disposed rearwardly from said support bracket is brought into abutment with a part of said support bracket to absorb energy created by said collision while plastically deforming said support bracket.

6. A device according to claim 2, further comprising:
   a rear support bracket to support a rear part of said steering column to the vehicle body, said rear support bracket allowing the steering column to move up and down to effect tilt adjustment and allowing forward movement of the steering column in response to the secondary collision; and
   an energy absorbing member provided between said steering column and said rear support bracket, said energy absorbing member being plastically deformed by said forward movement of the steering column in response to the secondary collision.

7. A device according to claim 5, wherein said steering column is formed by a single cylindrical member.

8. A tilt-type steering apparatus, comprising:
   a support bracket supporting a front part of a steering column for rocking movement with respect to a vehicle body, the support bracket being provided with a mounting portion by which said support bracket is fixed to the vehicle body and a support portion supporting said steering column,
   wherein said support portion is provided with a hole receiving said steering column therethrough, a plurality of support flaps spaced circumferentially of said hole, and a plurality of support walls which elastically press an outer periphery of the front part of said steering column, said support walls being respectively formed on inner peripheries of said plurality of support flaps and supporting the front part of said steering column for rocking movement, and wherein each of said support walls is bent towards a front end of said steering column from an inner periphery of a corresponding one of said support flaps.

9. An apparatus according to claim 8, wherein said support walls are bent such that said steering column may move forward in response to a secondary collision with substantially no biting of edges of said support walls into the outer periphery of said steering column.

10. An apparatus according to claim 9, further comprising:
   a rear support bracket supporting a rear part of said steering column to the vehicle body, said rear support bracket allowing the steering column to move up and down to effect a tilt adjustment and allowing forward movement of the steering column in response to a secondary collision; and
   an energy absorbing member provided between said steering column and said rear support bracket, said energy absorbing member being plastically deformed by said forward movement of the steering column in response to the secondary collision.

11. An apparatus according to claim 8, wherein said steering column is formed by a single cylindrical member.

12. A tilt-type steering apparatus, comprising:
   a support bracket supporting a front part of a steering column for rocking movement with respect to a vehicle body, said support bracket being provided with a mounting portion by which said support bracket is fixed to the vehicle body and a support portion supporting said steering column,
   wherein said support portion is provided with a hole receiving said steering column therethrough, a plurality of support flaps spaced circumferentially of said hole, said support flaps having inner peripheries elastically pressing an outer periphery of the front part of said steering column, and a protruding portion formed at the inner periphery of one of the support flaps provided either at an upper side or a lower side of said hole to be protruding more inward than other parts of this inner periphery, said protruding portion being engaged with a slit formed in a part aligned with said protruding portion in the front part of said steering column to thereby support the front part of said steering column in said hole for rocking movement about an engagement portion between said protruding portion and said slit as a center of rocking movement, and when said steering column is forward displaced in an axial direction at a secondary collision, an abutment portion on the outer periphery of said steering column and disposed rearwardly from said support bracket is brought into abutment with a part of said support bracket to absorb energy created by said collision while plastically deforming said support bracket.

13. An apparatus according to claim 12, further comprising:
   a rear support bracket supporting a rear part of said steering column to the vehicle body, said rear support bracket allowing the steering column to move up and down to deffect tilt adjustment and allowing forward movement of the steering column in response to the secondary collision; and
   an energy absorbing member provided between said steering column and said rear support bracket, said energy absorbing member being plastically deformed by said forward movement of the steering column in response to the secondary collision.

14. An apparatus according to claim 12, wherein said steering column is formed by a single cylindrical member.

15. An apparatus according to claim 12, wherein said abutment portion includes a portion of said steering column having an increased diameter.

* * * * *